United States Patent [19]

Piontek

[11] Patent Number: 5,590,939
[45] Date of Patent: Jan. 7, 1997

[54] RECONFIGURABLE SPACE FRAME CABINET

[75] Inventor: David P. Piontek, Canton, Mich.

[73] Assignee: ASC Incorporated, Southgate, Mich.

[21] Appl. No.: 336,166

[22] Filed: Nov. 7, 1994

[51] Int. Cl.$^6$ ........................................ A47B 47/03
[52] U.S. Cl. .................. 312/263; 312/264; 312/257.1;
312/265.1; 312/265.6; 312/270.1; 312/270.3;
312/224; 312/238; 312/245; 108/25; 108/26;
108/43
[58] Field of Search ........................... 312/263, 264,
312/265.1, 265.6, 257.1, 270.1, 270.3, 224,
238, 245; 108/25, 26, 43

[56] References Cited

U.S. PATENT DOCUMENTS

| | | |
|---|---|---|
| 1,631,718 | 6/1927 | Campbell . |
| 2,461,421 | 2/1949 | Jacobus .................. 312/224 X |
| 2,599,240 | 6/1952 | Ellerson .................. 312/346 |
| 2,602,310 | 7/1952 | Hansen .................. 108/25 X |
| 2,620,251 | 12/1952 | Restivo .................. 312/257.1 X |
| 2,628,147 | 2/1953 | Berner .................. 312/224 X |
| 2,739,697 | 3/1956 | Kuddes .................. 312/224 X |
| 2,986,438 | 5/1961 | Smathers et al. .................. 108/26 X |
| 3,104,140 | 9/1963 | Radi .................. 312/263 X |
| 3,149,878 | 8/1964 | Heermann . |
| 3,341,270 | 9/1967 | Sohl . |
| 3,419,933 | 1/1969 | Gossen . |
| 3,709,577 | 1/1973 | Rutherford et al. .................. 312/263 |
| 3,729,241 | 4/1973 | Schippers et al. . |
| 3,822,924 | 7/1974 | Lust . |
| 3,973,371 | 8/1976 | Heller . |
| 4,009,796 | 3/1977 | Schmidt . |
| 4,045,104 | 8/1977 | Peterson .................. 312/263 X |
| 4,053,192 | 10/1977 | Spetner . |
| 4,055,373 | 10/1977 | Andresen et al. .................. 312/263 |
| 4,109,981 | 8/1978 | Pfaehler . |
| 4,126,364 | 11/1978 | Reilly .................. 312/263 X |
| 4,154,493 | 5/1979 | Prater .................. 312/264 X |
| 4,184,433 | 1/1980 | Green .................. 108/26 X |
| 4,468,067 | 8/1984 | Jenkins .................. 312/263 X |
| 4,497,524 | 2/1985 | Levings, Jr. et al. .................. 312/257.1 X |
| 4,586,759 | 5/1986 | Wrobel . |
| 4,660,901 | 4/1987 | Shimada .................. 312/263 X |
| 4,691,970 | 9/1987 | Neri .................. 312/263 X |
| 4,782,637 | 11/1988 | Eriksson et al. .................. 312/263 X |
| 4,819,814 | 4/1989 | Fogelgren . |
| 4,961,607 | 10/1990 | Marshall, Sr. . |

(List continued on next page.)

FOREIGN PATENT DOCUMENTS

| | | | |
|---|---|---|---|
| 520362 | 1/1956 | Canada .................. | 312/265.5 |
| 628786 | 9/1949 | United Kingdom ............... | 312/257.1 |

OTHER PUBLICATIONS

Freightliner "70–Inch Raised Roof SleeperCab" a picture is attached.

J. Kaltz & Co. "G*Grass Superior Hinges, Drawer Slides and Assembly Machinery", pp. 14 & 55.

*Primary Examiner*—Peter M. Cuomo
*Assistant Examiner*—Rodney B. White
*Attorney, Agent, or Firm*—Harness, Dickey & Pierce

[57] ABSTRACT

Disclosed is a reconfigurable space frame cabinet for mounting to a vehicle and a method of assembly therefor. The reconfigurable space frame cabinet includes four elongated corner members having two parallel extending grooves on a first side and a plurality of mounting holes on a second side for adjustably mounting various hardware fittings. First and second channel members having first and second channels, respectively, are mounted substantially perpendicular to the four elongated corner member. First and second side panels are positioned within the first and second channels adjacent to the elongated corner members. Four trim covers, each having two parallel extending fingers are used for removably engaging the two parallel extending grooves in the elongated corner members. A top assembly having various recessed features is mounted substantially perpendicular to each elongated corner member. The entire space frame cabinet is then removably mounted to the vehicle in a manner such that the reconfigurable space frame cabinet can be reconfigured into various configurations to meet the user's requirements.

43 Claims, 4 Drawing Sheets

U.S. PATENT DOCUMENTS

| | | |
|---|---|---|
| 4,969,678 | 11/1990 | Loisel . |
| 4,986,589 | 1/1991 | McNew . |
| 5,039,177 | 8/1991 | Newell et al. .................... 312/263 X |
| 5,086,593 | 2/1992 | Walentine . |
| 5,137,321 | 8/1992 | Landry et al. . |
| 5,165,770 | 11/1992 | Hahn . |
| 5,228,762 | 7/1993 | Mascrier ......................... 312/265.1 X |
| 5,427,292 | 6/1995 | Rousch .................................. 108/25 X |

RECONFIGURABLE SPACE FRAME CABINET

BACKGROUND OF THE INVENTION

I. Technical Field

This invention relates generally to a cabinet and a method of assembly therefor and, more particularly, to a reconfigurable space frame cabinet which can be reconfigured into different configurations.

II. Discussion

Today, various cabinet structures are used within sleeper cabins of semi-trucks, as well as other vehicles. These cabinets serve as storage devices for various items that a driver may require. For instance, these cabinets are generally used for storing clothing, toiletries, food and tools. In general, the cabinets provide static shelves or open spaces for such storage and have a basic construction. The construction of such cabinets typically consist of one-piece molded units which are rigidly mounted within the sleeper cabin itself.

Since these units consist of one-piece molded units, the cabinets only support one function, and are thus not very versatile or easily reconfigured for various uses. For example, during the operational life of a semi-truck, there may be several individuals or companies which own the semi-truck. Each of these individuals or companies may require some specific features based on their needs. One individual may perform long, extended shipping services and require a refrigeration unit in the cabinet for food storage. Other individuals may require specialized tool storage. Such specific requirements and configurations are too numerous to mention here. However, in each of these situations, the entire cabinet would need to be replaced with a new cabinet which supports the required features. Such replacement ultimately results in higher changeover costs between users or companies. Moreover, if part of a typical one-piece cabinet is damaged due to use or even installation, the entire cabinet must be scrapped and replaced with an entire new cabinet.

What is needed then, is a reconfigurable space frame cabinet and a method of assembly therefor which does not suffer from the above-mentioned limitations. This will, in turn, eliminate the need for replacing an entire cabinet any time the owner's requirements change or if part of the cabinet is damaged. Moreover, the reconfigurable space frame cabinet would be extremely versatile and easily reconfigurable for various customized uses, as well as allowing sectional replacement of only the sections which are damaged or need to be replaced. It is, therefore, an object of the present invention to provide such a reconfigurable space frame cabinet and method of assembly therefor.

SUMMARY OF THE INVENTION

In accordance with the teachings of the present invention, a reconfigurable space frame cabinet for removably mounting to a vehicle and a method of assembly therefor is disclosed. This reconfigurable space frame cabinet essentially consists of various individual pieces which are removably mounted to one another such that the reconfigurable space frame can be easily reconfigured to support various cabinet features. For example, these features include shelves with cargo netting, drawers, doors, refrigeration units and any combination thereof.

In one preferred embodiment, four elongated corner members are provided, each having two parallel extending grooves on a first side and a plurality of mounting holes on a second side for adjustably mounting various hardware fittings. A first channel member having a first channel is mounted substantially perpendicular to two of the elongated corner members, while a second channel member having a second channel is mounted substantially perpendicular to the remaining two elongated corner members. A first side panel is positioned within the first channel of the first channel member and a second side panel is positioned within the second channel of the second channel member. Four trim covers each having two parallel extending fingers are used for removably engaging the two parallel extending grooves in the elongated corner members. A top assembly having various recessed features is mounted substantially perpendicular to each elongated corner member. Once assembled, the entire space frame cabinet is removably mounted to the vehicle in a manner such that the reconfigurable space frame cabinet can be reconfigured into various configurations to meet the user's requirements.

Use of the present invention provides a versatile and reconfigurable space frame cabinet for use in a vehicle and a method of assembly therefor. As a result, the aforementioned limitations and drawbacks associated with the current construction of cabinets provided within vehicles have been substantially eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT

It should be understood at the outset that while this invention is described in connection with various specific embodiments, that additional modifications and combinations will become apparent to those skilled in the art after having the benefit of reading this detailed description. Moreover, while this invention is described below in connection with mounting within a sleeper cabin of a semi-truck, those skilled in the art would readily recognize that the reconfigurable space frame cabinet can be mounted in various other vehicles such as mobile homes, trains, cars and planes or can be utilized as a reconfigurable cabinet for the home or office.

Figures 1, 3:
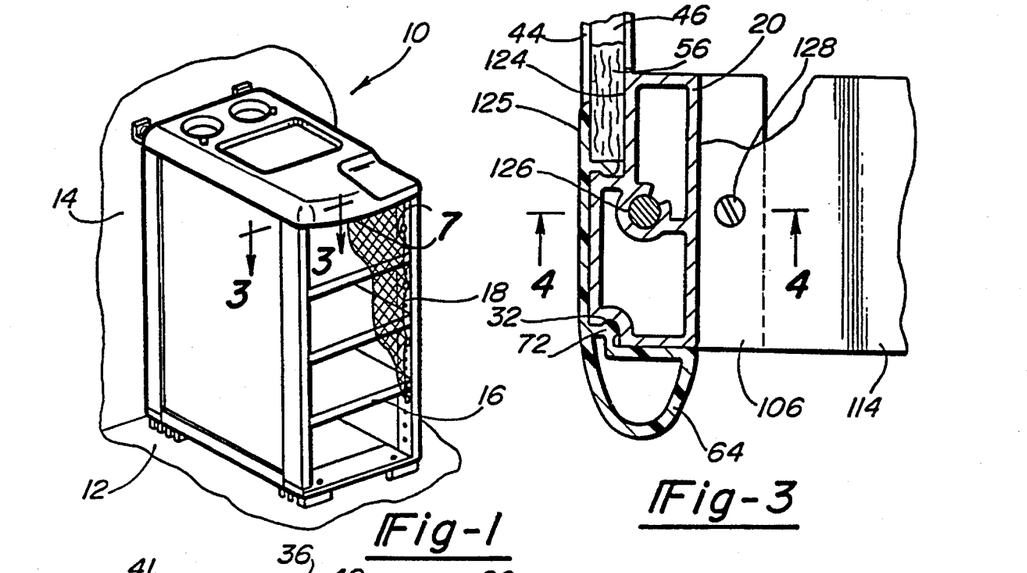
FIG. 1 is a perspective view of one preferred embodiment of the present invention.
FIG. 3 is a horizontal cross-sectional view of a corner assembly of the present invention taken along line 3—3 of FIG. 1.

Referring to FIG. 1, a perspective view of one preferred embodiment of a reconfigurable space frame cabinet 10, is shown. The space frame cabinet 10 is shown removable mounted to a substantially horizontal vehicle member 12 and a substantially vertical vehicle member 14. The space frame cabinet 10, as shown in FIG. 1, is configured with three adjustable shelves 16 and a cargo net 18.

Figures 2, 7:
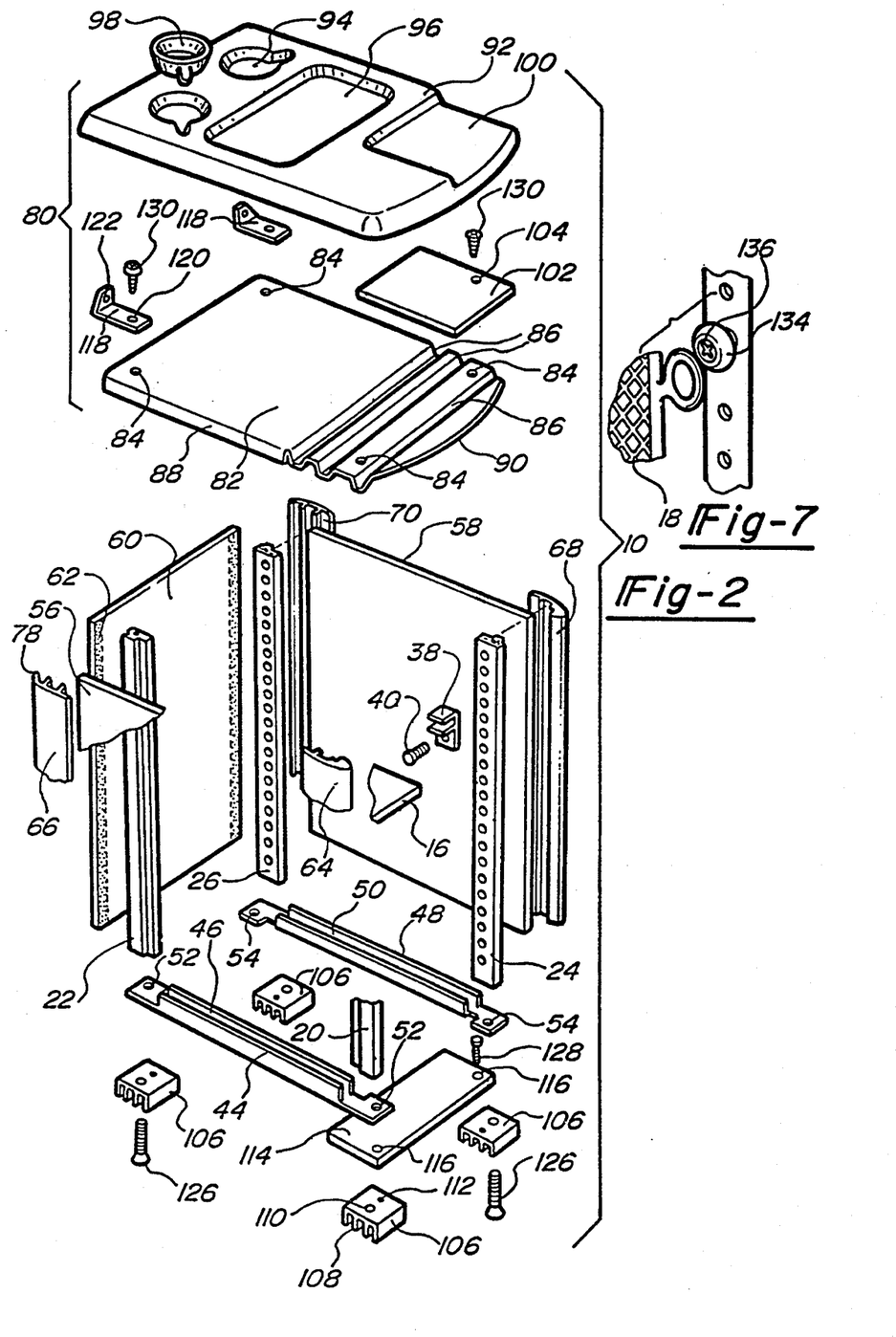
FIG. 2 is an exploded perspective view of the embodiment in FIG. 1.
FIG. 7 is a perspective view of a hardware fitting taken about line 7 of FIG. 1.

Turning to FIG. 2, an exploded perspective view of the construction of the space frame cabinet 10, is shown in detail. The space frame cabinet 10 includes a first elongated corner member 20, a second elongated corner member 22, a third elongated corner member 24 and a fourth elongated corner member 26. The elongated corner members 20–26 are preferably about twenty-one inches long and formed from extruded aluminum. The first elongated corner member 20, is shown clearly in FIG. 5 and is essentially equivalent to the other elongated corner members 22–26 except for the specific right/left and front/back orientation of the corner members 20–26, as shown in FIG. 2. The first elongated corner member 20 has a first side 28 and a second side 30 with a cross-sectional length of about two inches and a cross-sectional width of about 0.8 inches. Two parallel extending groves 32 are formed from a parallel extension 34 of the first side 28 and extend substantially the length of the first elongated corner member 20. A plurality of holes 36 are evenly spaced about the second side 30 for adjustably mounting various hardware fittings such as a shelf support 38 mounted with a bolt 40, shown in FIG. 2. The first elongated corner member 20 further includes hollow portions 41 and an axial bore 42, each extending axially through the first elongated corner member 20.

Returning to FIG. 2, the space frame cabinet 10 further includes a first frame or channel member 44 having a first channel 46 and a second frame or channel member 48 having a second channel 50. The first channel member 44 is mounted substantially perpendicular to the first elongated corner member 20 and the second elongated corner member 22 through mounting holes 52 located at each end of the first channel member 44. The second channel member 48 is mounted substantially perpendicular to the third elongated corner member 24 and the forth elongated corner member 26 through mounting holes 54 located at substantially the ends of the second channel member 48. The first channel member 44 and the second channel member 48 are preferably about twenty-five inches (25") in length and formed from extruded aluminum, similar to the elongated corner members 20–26.

A first side panel 56, shown partial cutaway in FIG. 2, is inserted into the first channel 46 of the first channel member 44 and mounted adjacent to the first elongated corner member 20 and the second elongated corner member 22 along the grooves 32. A second side panel 58 is inserted into the second channel 50 of the second channel member 48 and mounted adjacent to the third elongated corner member 24 and the fourth elongated corner member 26 along the grooves 32. The first and second side panels 56 and 58 are preferably about twenty-one inches (21") tall by about twenty-five inches long. A rear panel 60 is removably mounted to the second elongated corner member 22 and the forth elongated corner member 26 preferably by an adhesive 62. The rear panel 60 is preferably about twenty-one inches (21")tall by about seventeen inches (17") wide. It should also be noted that one skilled in the art would recognize that the rear panel 60 can also be removably mounted by various other means such as screws or rivets. Moreover, the first and second side panels 56 and 58 and the rear panel 60 can be made to various other sizes to meet a user's requirements. The first side panel 56, the second side panel 58 and the rear panel 60 are all preferably constructed from a waterproof cardboard which is covered with vinyl. The first side panel 56, the second side panel 58 and the rear panel 60 can also be constructed of material such as wood or plastic and can be covered in material such as carpet or formica.

Figures 4, 5, 6:
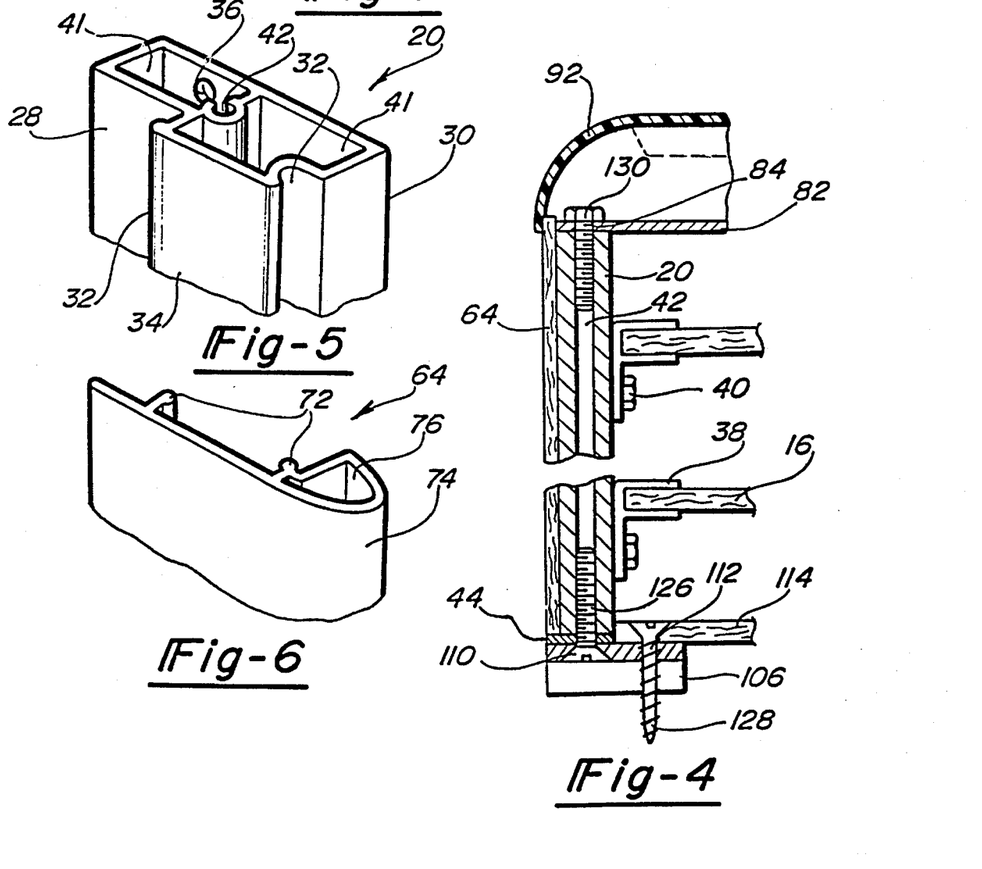
FIG. 4 is a vertical cross-sectional view of the corner assembly taken along line 4—4 of FIG. 3.
FIG. 5 is a perspective view of an elongated corner member of the present invention.
FIG. 6 is a perspective view of one preferred embodiment of a trim cover of the present inventor.
Figures 9, 10:
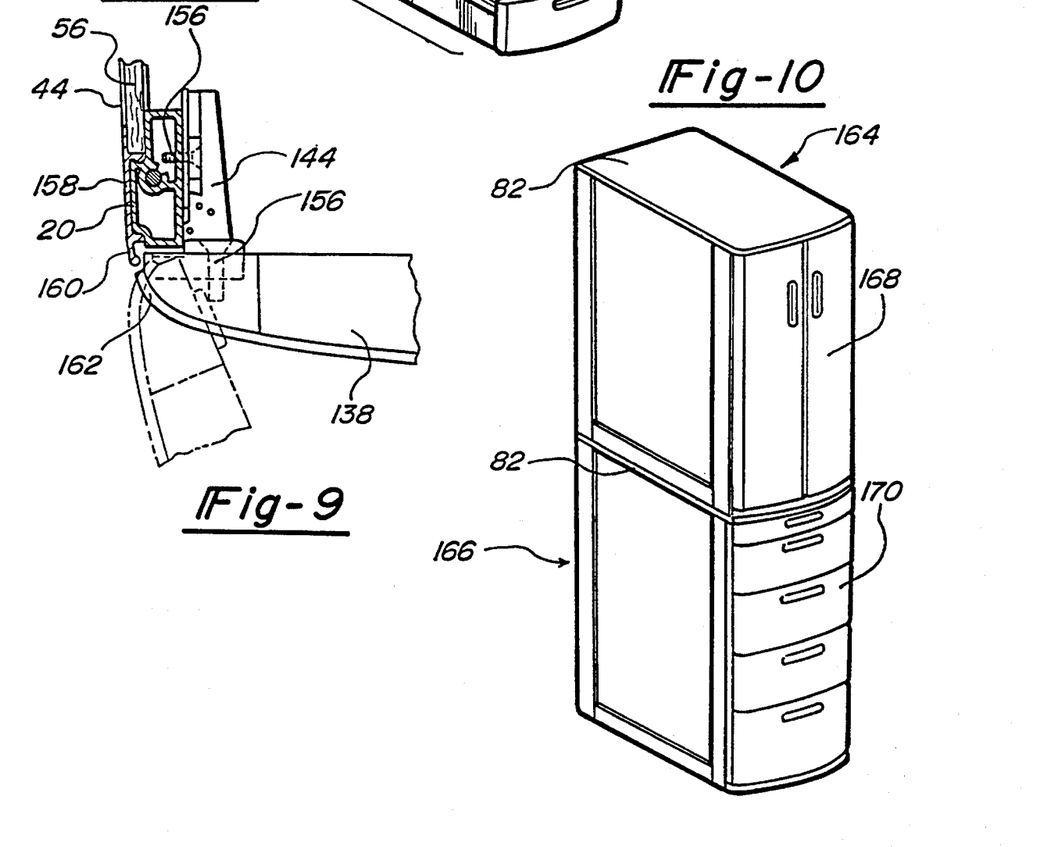
FIG. 9 is a horizontal cross-sectional view of a hinged door corner assembly of the embodiment in FIG. 8 taken along line 9—9 of FIG. 8.
FIG. 10 is a perspective view of a another preferred embodiment of the present invention stacked atop yet another preferred embodiment of the present invention.

The space frame cabinet 10 further includes a first trim cover 64, a second trim cover 66, a third trim cover 68 and a forth trim cover 70. The first trim cover 64, shown clearly in FIG. 6, is substantially identical to the third trim cover 68 except for having an opposite right/left orientation, as shown in FIG. 2. The first trim cover 64 includes two parallel extending fingers 72 which are used to engage the grooves 32 in the first elongated corner member 20, as will be discussed in more detail shortly. The first trim cover 64 further includes a semi-circular side 74 formed about a hollow portion 76. The semi-circular side 74 of the first trim cover 64 is used when the space frame cabinet 10 is configured with shelves 16 so that the front of the space frame cabinet 10 has an aesthetically pleasing appearance. If the space frame cabinet 10 is configured to include doors and drawers, the first trim member 64 and the third trim member 68 will not contain the semi-circular side 74 and will be configured as shown in FIG. 9. The second trim cover 66 and the fourth trim cover 70, shown in FIG. 2, also include the two parallel extending fingers 72 and are configured in opposite right/left pairs as with the first trim cover 64 and the third trim cover 68. The second trim cover 66 and the fourth trim cover 70, however, will not contain the semi-circular side 74 and will only have a curved portion 78, similar to that shown in FIG. 9. Each trim cover is preferably made of a resilient plastic such as polyvinyl chloride (PVC) so that the two parallel extending fingers 72 can resiliently engage or snap into grooves 32 to support the removal of the trim covers 64–70 several times over the life of the space frame cabinet 10.

A top assembly 80 is removably mounted substantially perpendicular to the elongated corner members 20–26. The top assembly 80 includes a substantially rigid top mounting plate 82 formed from aluminum. The top mounting plate 82 includes four mounting holes 84 and three (3) channels 86 which provide extra rigidity to the top mounting plate 82. The top mounting plate 82 further includes a downturned vertical rim 88 and a curved front edge 90. Positioned atop the top mounting plate 82 is a top cover 92 molded from a plastic such as polyvinyl chloride (PVC). The top cover 92 is removably mounted to the top mounting plate 82 with Velcro or an adhesive (not shown). The top cover 92 includes two recessed cup holders 94 along with a recessed storage area 96. Inserted within the recessed cup holders 94 are cup inserts 98 which can easily be removed for cleaning. The top cover 92 further includes a recessed step 100 positioned in substantially the front right corner of the top cover 92. This recessed step 100 allows a user to easily reach structures such as a bunkbed (not shown), positioned within a sleeper cabin of a semi-truck (not shown). In order to support the weight of a user, a reinforced plate 102 constructed from aluminum is removably mounted below the recessed corner step 100 through a hole 104. It should be noted that while the top cover 92 is discussed in reference to containing the two recessed cup holders 94, the recessed storage area 96 and the recessed step 100, one skilled in the art would recognize that the top cover 92 can be configured in other numerous ways.

The space frame cabinet 10 is mounted to the horizontal vehicle member 12 by four base mounting members 106. Each base mounting member 106 includes four parallel extending support beams 108, a first mounting hole 110 and a second mounting hole 112. The first mounting hole 110 is used to removably mount the base mounting members 106 to the elongated corner members 20–26, while the second mounting hole 112 is used to removably mount the space frame cabinet 10 to the horizontal vehicle member 12. Positioned atop the front two base mounting members 106 is a width controlling member 114. As seen in FIG. 2, the width controlling member 114 contains mounting holes 116 which are aligned with holes 112. The width controlling member 114 is used to maintain the width of the space frame cabinet 10 before it is installed in a vehicle (not shown). This is done to insure that the various optional features such as drawers and doors remain in alignment prior to mounting the space frame cabinet 10 within the vehicle. It should also be noted that if only shelves 16 are utilized and are rigidly secured to the shelf supports 38 such that the width of the space frame cabinet 10 can be controlled, the width controlling member 114 can be excluded from such a cabinet 10.

A pair of top angled brackets 118 are also provided for removably mounting the space frame cabinet 10 to the vertical vehicle member 14. The top angled brackets 118 each include a first mounting hole 120 and a second mounting hole 122. The first mounting holes 120 are used to mount the top angled brackets 118 to the second elongated corner member 22 and the fourth elongated corner member 26 while the second mounting holes 122 are used to mount the space frame cabinet 10 to the vertical vehicle member 14. The top angled brackets 118, as well as the base mounting members 106 are preferably constructed from aluminum. This mounting structure provides a rigid support for the space frame cabinet 10 while also providing a means for easily removing or repositioning the space frame cabinet 10 within the vehicle. It should also be noted that since the space frame cabinet 10 does not contain a bottom or base plate, the horizontal vehicle member 12 serves as the base or bottom of the space frame cabinet 10. Moreover, since the space frame cabinet 10 is also mounted to the vertical vehicle member 14, the rear panel 60 can be eliminated in some instances.

Referring to FIG. 3, a front left corner assembly of the embodiment in FIG. 1 is shown in cross-section. The first side panel 56 is shown inserted in the first channel 46 of the first channel member 44. The first side panel 56 is removable mounted to the first elongated corner member 20 along edge 124 preferably with an adhesive. It should be noted that the first side panel 56 is also mounted to the second elongated corner member 22 in substantially the same way, while the second side panel 58 is also mounted to the third elongated corner member 24 and the fourth elongated corner member 26 in substantially the same way with an opposite right/left configuration. Moreover, one skilled in the art would recognize that the first side panel 56 and a second side panel 58 can be mounted using other means such as screws or rivets to the elongated corner members 20–26. The first trim cover 64 is shown snapped into place adjacent the first elongated corner member 20 with the two parallel extending fingers 72 engaging the two parallel extending grooves 32. The first trim cover 64 having extension 125 also secures and provides mounting support for the first side panel 56, such that the adhesive, screws or rivets can be eliminated for mounting the first side panel 56, if desired. A base mounting member 106 is also shown bolted to the first elongated corner member 20 through hole 110 into bore 42 with a bolt 126. The base mounting member 106 is also mounted to the horizontal vehicle member 12 through hole 112 with a screw 128.

Referring to FIG. 4, a vertical cross sectional view of the front left corner assembly of the space frame cabinet 10, is shown. As seen from this view, the top mounting plate 82 is bolted to the first elongated corner member 20 through the hole 84 to the axial bore 42 with a bolt 130. Positioned atop the top mounting plate 82 is the top cover 92. The base mounting member 106 is bolted to the first elongated corner member 20 with the bolt 126 through the hole 110 also into the axial bore 42. A clear view of how the base mounting member 106 is screwed to the horizontal vehicle member 12, is also shown, where the screw 128 secures the base mounting member 106 through hole 112. The shelves 16 are also clearly shown positioned in the shelf supports 38 with bolts 40. Adjustably mounted to the front of the space frame cabinet 10 is the cargo net 18 which is mounted to a nub 134 via a screw 136, shown clearly in FIG. 7.

Figure 8:
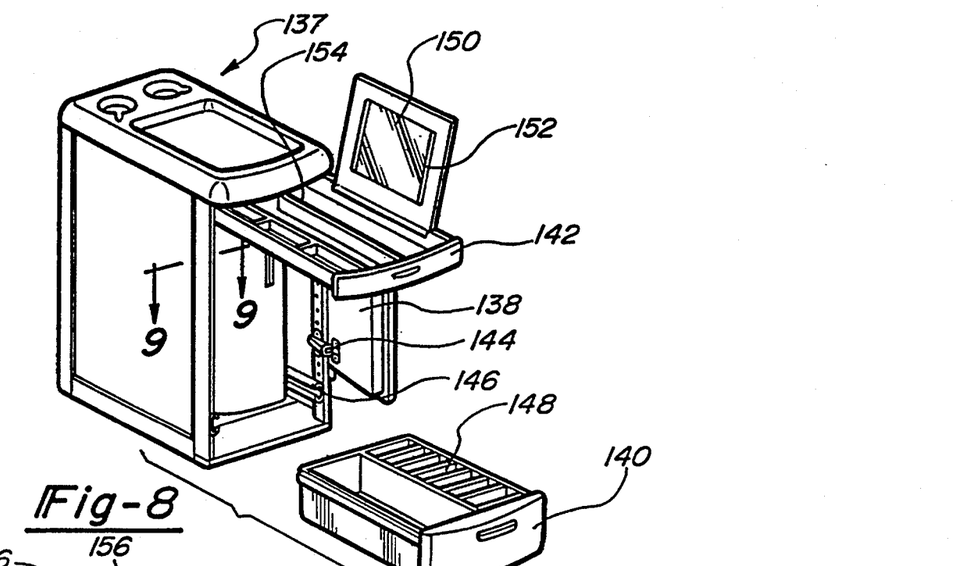
FIG. 8 is a perspective view of another preferred embodiment of the present invention.

A second embodiment of a reconfigurable space frame cabinet 137 is shown in FIG. 8. The space frame cabinet 137 is configured to include a pair of doors 138, a drawer 140 and another drawer 142. The doors 138 are mounted to the first elongated corner member 20 and the third elongated corner member 24 via two pairs of hinges 144. The drawer 140 is adjustably mounted within the space frame cabinet 137 via a pair of drawer rails 146 which are adjustably mounted to the elongated corner members 20–26. The drawer 142 is similarly mounted with a pair of drawer rails 146 (not shown). The drawer 140 includes a cassette tape rack 148 operable to store numerous cassette tapes (not shown). The drawer 142 includes a flip-up vanity mirror 150 having a pair of lights 152, as well as several drawer dividers 154.

Referring to FIG. 9, a front left cross-section of the hinged corner assembly of the embodiment in FIG. 8, is shown. As shown in FIG. 9, the door 138 is mounted to the first elongated corner member 20 using the hinge 144 via bolts 156. A trim cover 158 similar to the second and fourth trim covers 66 and 70 are used. The trim cover 158 differs from the first trim cover 64 in that the trim cover 158 does not have the semi-circular side 74. The trim cover 158 has a curved portion 160 which flows into a curved portion 162 of the door 138 to form an aesthetically pleasing curved surface. As the door 138 is open, the hinge 144, which is preferably a overlay hinge manufactured by Grass, Inc., allows the curved portion 162 of the door 138 to fold inward, as shown clearly in hidden lines in FIG. 9.

Turning to FIG. 10, another embodiment of a space frame cabinet 164 is shown mounted atop an additional embodiment of a space frame cabinet 166. The space frame cabinet 164 contains a pair of doors 168 while the space frame cabinet 166 contains five drawers 170. In order to mount the space frame cabinet 164 atop the space frame cabinet 166, a top mounting plate 82 without the channels 86 is used in the space frame cabinet 166. Additionally, a top mounting plate 82 without the channels 86 is also used on the space frame cabinet 164 since the top of the space frame cabinet 164 is generally unaccessible to a typical user when stacked upon the space frame cabinet 166. In addition, the top cover 92 for each space frame cabinet 166 and 164 will not be required. The space frame cabinet 164 is removably mounted to the space frame cabinet 166 along the first and second channel members 44 and 48 with screws (not shown).

Figures 11, 12, 13, 14:
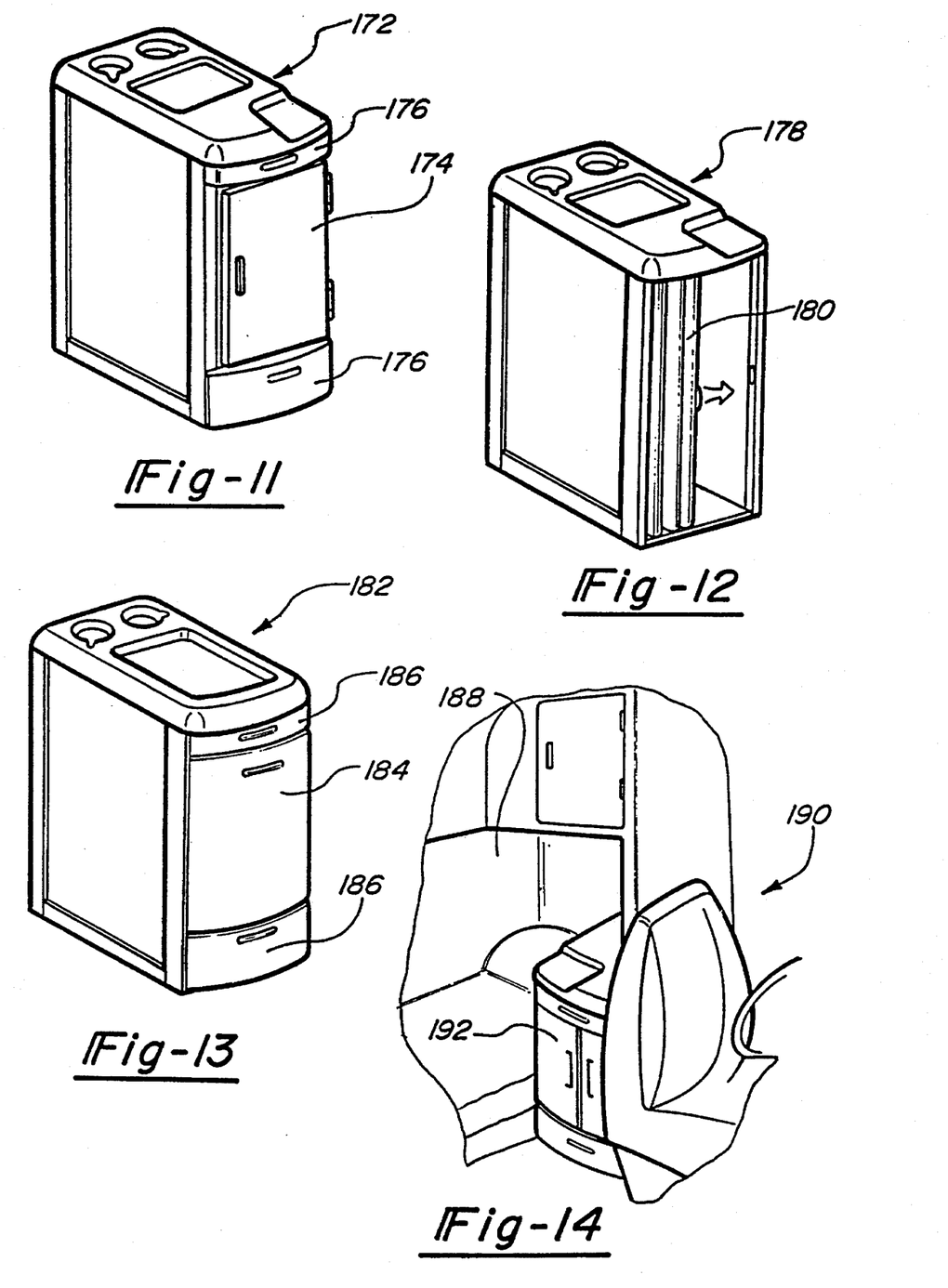
FIG. 11 is a perspective view of another preferred embodiment of the present invention.
FIG. 12 is a perspective view of another preferred embodiment of the present invention.
FIG. 13 is a perspective view of another preferred embodiment of the present invention.
FIG. 14 is a perspective view of one preferred embodiment of the present invention shown removably mounted within a vehicle.

Referring to FIGS. 11–13, additional embodiments of the present invention are shown. In FIG. 11, a space frame cabinet 172 is shown having a refrigeration unit 174 and two drawers 176. In FIG. 12, a space frame cabinet 178 is shown having a foldable accordion door 180. In FIG. 13, a space frame cabinet 182 is shown having a file drawer 184 and two (2) additional drawers 186.

As previously indicated, the space frame cabinets, as shown in FIGS. 1–13, are typically mounted in a sleeper cabin 188 of a semi-truck 190, as shown clearly in FIG. 14, in which the space frame cabinet has a reference numeral 192. This allows a driver of the semi-truck 190 to store various items within the sleeper cabin 188 depending on the particular requirements of the driver. If the driver's requirements change or if a new driver or company purchases the truck, the new driver or company can easily reconfigure the space frame cabinet 192 into several different configurations. An example might be any one of the various embodiments shown in FIGS. 1–13. Additionally, the colors of the unit can easily be changed by changing the appropriate pieces, as well as the material. Moreover, the size of the space frame cabinet 192 can be customized to meet various drivers' requirements.

In order to construct or assemble the space frame cabinet 10, the following steps are performed. The first elongated corner member 20, the second elongated corner member 22, the first channel member 44 and two base mounting members 106 are bolted together through holes 110 and 52 into bore 42 with bolts 126. If the width controlling member 114 is required, this member 114 is also mounted to the base mounting member 106 through hole 112. The third elongated corner member 24 and the fourth elongated corner member 26 are then bolted to the second channel member 48 along with the two remaining base members 106, in the same manner as the first elongated corner member 20 and the second elongated corner member 24.

The top mounting plate 82 along with the top angle brackets 118 and the reinforced plate 102 are then bolted to the elongated corner members 20–26, as shown in FIG. 2. The first side panel 56 is positioned within the first channel 46 and removably mounted to the first elongated corner member 20 and the second elongated corner member 22. The second side panel 56 is positioned within the second channel 50 and removably mounted to the third elongated corner member 24 and the fourth elongated corner member 26. The rear panel 60 is then removably mounted to the second elongated corner member 22 and the fourth elongated corner member 26.

Each trim cover 64–70 is then snapped into place in the grooves 32 with the fingers 72 thereby providing a smooth corner in addition to providing mounting support for the first side panel 56 and the second side panel 58. Moreover, it should be noted that the trim cover 64–70 can solely be used to retain or removably position the first side panel 56 and the second side panel 58. The top cover 92 is then removably mounted atop the top mounting plate 82 using Velcro or an adhesive. Various hardware fittings such as shelf supports 38, hinges 144 and drawer rails 146 are then adjustably mounted to the holes 36 in the elongated corner members 20–26 depending on the user's requirements. The corresponding shelves 16, doors 138 or drawers 140 are then matched to the corresponding hardware fittings. Finally, the space frame cabinet 10 is bolted to the horizontal vehicle member 12 and the vertical vehicle member 14 with the base mounting members 106 and the side angle brackets 118. Construction in such a manner provides a versatile reconfigurable space frame cabinet 10 which can be easily modified to meet the user's requirements whatever they may be.

The foregoing discussion discloses and describes merely exemplary embodiments of the present invention. One skilled in the art would readily recognize from such a discussion, and from the accompanying drawings and claims, that various changes, modifications and variations can be made therein without departing from the spirit and scope of this invention as defined by the following claims.

What is claim is:

1. A reconfigurable cabinet, said reconfigurable cabinet comprising:

a first corner member, a second corner member and a third corner member, each corner member having a first side and a second side, said second side having mounting means for adjustably mounting a plurality of hardware fittings;

a first frame member removably mounted to a first pair of corner members;

a second frame member removably mounted to a second pair of corner members;

a first side panel removably supported by said first frame member and being disposed between said first pair of corner members;

a second side panel removably supported by said second frame member and being disposed between said second pair of corner members;

a top removably mounted to each corner member;

a first trim cover having an extension and an engagement means for removably engaging the first side of the first corner member;

a second trim cover having an extension and an engagement means for removably engaging the first side of the second corner member; and a third trim cover having an extension and an engagement means for removably engaging the first side of the third corner member, said trim covers removably securing said first and second side panels against said corner members with said extensions so that said trim covers and said first and second side panels can be readily removed from said corner members to reconfigure the cabinet into a different configuration.

2. The reconfigurable cabinet as defined in claim 1 further comprising a fourth corner member having a first side and a second side, said second side having said mounting means for adjustably mounting the plurality of hardware fittings; and a fourth trim cover having an extension and an engagement means for removably engaging the first side of the fourth corner member.

3. The reconfigurable cabinet as defined in claim 1 wherein said first frame member includes a first channel and said second frame member includes a second channel, said first side panel being removably positioned within said first channel and said second side panel being removably positioned within said second channel.

4. The reconfigurable cabinet as defined in claim 1 further comprising mounting means for removably mounting the reconfigurable space frame cabinet to a substantially horizontal member and a substantially vertical member.

5. The reconfigurable cabinet as defined in claim 4 wherein the substantially horizontal member and the substantially vertical member are a part of a vehicle.

6. The reconfigurable cabinet as defined in claim 1 wherein the mounting means includes a plurality of mounting holes on the second side of each corner member.

7. The reconfigurable cabinet as defined in claim 1 wherein the first side of the first corner member, the second corner member and the third corner member includes two (2) parallel extending grooves.

8. The reconfigurable cabinet as defined in claim 7 wherein the engagement means of the first trim cover, the second trim cover and the third trim cover include two parallel extending resilient fingers for removably and resiliently engaging the two parallel extending grooves in the first corner member, the second corner member and the third corner member.

9. The reconfigurable cabinet as defined in claim 1 further comprising cabinet features selected from the group consisting of shelves, door, drawers and refrigeration units, wherein the reconfigurable cabinet is reconfigured by selecting said cabinet features.

10. A reconfigurable space frame cabinet for removably mounting to a vehicle, said reconfigurable space frame cabinet comprising:

a first elongated corner member, a second elongated corner member, a third elongated corner member, and a fourth elongated corner member, each elongated corner member having two parallel extending grooves on a first side of the elongated corner member and a plurality of mounting holes on a second side of the elongated corner member for adjustably mounting a plurality of hardware fittings;

a first channel member removably mounted substantially perpendicular to the first and second elongated corner members, said first channel member having a first channel;

a second channel member removably mounted substantially perpendicular to the third and fourth elongated corner members, said second channel member having a second channel;

a first side panel removably positioned within the first channel of the first channel member, said first side panel being adjacent to the first and second elongated corner members;

a second side panel removably positioned within the second channel of the second channel member, said second side panel being adjacent to the third and fourth elongated corner members;

a first trim cover having an extension and two parallel extending fingers for removably engaging the two parallel extending grooves in the first elongated corner member;

a second trim cover having an extension and two parallel extending fingers for removably engaging the two parallel extending grooves in the second elongated corner member;

a third trim cover having an extension and two parallel extending fingers for removably engaging the two parallel extending grooves in the third elongated corner member;

a fourth trim cover having an extension and two parallel extending fingers for removably engaging the two parallel extending grooves in the fourth elongated corner member;

a top assembly removably mounted substantially perpendicular to each elongated corner member; and mounting means for removably mounting the reconfigurable space frame cabinet to the vehicle, wherein said trim covers removably secure said first and second side panels against said corner members with said extensions so that the reconfigurable space frame cabinet can be reconfigured into a plurality of different configurations.

11. The reconfigurable space frame cabinet as defined in claim 10 further comprising a rear panel removably mounted to the second and fourth elongated corner members.

12. The reconfigurable space frame cabinet as defined in claim 11 wherein the first side panel, the second side panel and the rear panel are constructed of a material selected from the group consisting of plastic, wood and waterproof cardboard.

13. The reconfigurable space frame cabinet as defined in claim 11 wherein the first side panel, the second side panel and the rear panel are covered with a material selected from the group consisting of vinyl, carpet and formica.

14. The reconfigurable space frame cabinet as defined in claim 11 wherein the first side panel is removably mounted to the first and second elongated corner members, the second side panel is removably mounted to the third and fourth elongated corner members, and the rear panel is removably mounted to the second and fourth elongated corner members.

15. The reconfigurable space frame cabinet as defined in claim 14 wherein the first side panel, the second side panel and the rear panel are each removably mounted to their respective elongated corner members using a mounting device selected from the group consisting of adhesive, screws and rivets.

16. The reconfigurable space frame cabinet as defined in claim 10 wherein the two parallel extending grooves on the first side of the first elongated corner member, the second elongated corner member, the third elongated corner member, and the fourth elongated corner member extend substantially the length of the elongated corner members.

17. The space frame cabinet as defined in claim 10 wherein the first elongated corner member, the second elongated corner member, the third elongated corner member and the fourth elongated corner member, each has a first end and a second end with an axial bore extending through the elongated corner member from the first end to the second end.

18. The reconfigurable space frame cabinet as defined in claim 17 wherein the axial bore in the first elongated corner member, the second elongated corner member, the third elongated corner member and the fourth elongated corner member are operable for receiving a bolt at the first end and the second end.

19. The reconfigurable space frame cabinet as defined in claim 10 wherein each elongated corner member is constructed of aluminum.

20. The reconfigurable space frame cabinet as defined in claim 10 wherein the first channel in the first channel member extends substantially the length of the first channel member and the second channel in the second channel member extends substantially the length of the second channel member.

21. The reconfigurable space frame cabinet as defined in claim 10 wherein the first channel member and the second channel member are constructed of aluminum.

22. The reconfigurable space frame cabinet as defined in claim 10 wherein the first channel member is bolted substantially perpendicular to the first and second elongated corner members and the second channel member is bolted substantially perpendicular to the third and fourth elongated corner members.

23. The reconfigurable space frame cabinet as defined in claim 10 wherein the parallel extending fingers in the first trim cover, the second trim cover, the third trim cover, and the fourth trim cover are resilient and extend substantially the length of the trim covers.

24. The reconfigurable space frame cabinet as defined in claim 10 wherein the first trim cover, the second trim cover, the third trim cover and the fourth trim cover are constructed of plastic.

25. The reconfigurable space frame cabinet as defined in claim 10 wherein the first and third trim covers have a semicircular side.

26. The reconfigurable space frame cabinet as defined in claim 10 wherein the top assembly includes a top mounting plate removably mounted to each elongated corner member and a top cover removably mounted atop the top mounting plate.

27. The reconfigurable space frame cabinet as defined in claim 26 wherein the top mounting plate is constructed of aluminum and the top cover is constructed of plastic.

28. The reconfigurable space frame cabinet as defined in claim 27 wherein the top cover includes at least one recessed cup holder and at least one recessed storage area.

29. The reconfigurable space frame cabinet as defined in claim 27 wherein the top cover includes a recessed corner step having a reinforced plate removably positioned below the recessed corner step.

30. The reconfigurable space frame cabinet as defined in claim 10 wherein the mounting means includes four base mounting members each removably mounted to an elongated corner member, each base mounting member operable to be removably mounted to a substantially horizontal vehicle member.

31. The reconfigurable space frame cabinet as defined in claim 30 wherein the mounting means further includes a first top angled bracket removably mounted to the second elongated corner member and a second top angled bracket removably mounted to the fourth elongated corner member, said first and second top angled brackets operable to be removably mounted to a substantially vertical vehicle member.

32. The reconfigurable space frame cabinet as defined in claim 31 wherein the four base mounting members and the first and second top angled brackets are constructed of aluminum.

33. The reconfigurable space frame cabinet as defined in claim 10 further comprising at least one drawer adjustably mounted to the plurality of hardware fittings.

34. The reconfigurable space frame cabinet as defined in claim 33 wherein at least one drawer includes a flip-up vanity mirror.

35. The reconfigurable space frame cabinet as defined in claim 10 further comprising at least one pair of doors adjustable mounted to the plurality of hardware fittings.

36. The reconfigurable space frame cabinet as defined in claim 10 further comprising at least one refrigeration unit adjustable mounted to the plurality of hardware fittings.

37. The reconfigurable space frame cabinet as defined in claim 10 further comprising at least one shelf adjustable mounted to the plurality of hardware fittings.

38. The reconfigurable space frame cabinet as defined in claim 10 further comprising at least one cargo net adjustably mounted to the plurality of hardware fittings.

39. The reconfigurable space frame cabinet as defined in claim 10 further comprising at least one accordion door adjustable mounted to the plurality of hardware fittings.

40. The reconfigurable space frame cabinet as defined in claim 10 wherein a first space frame cabinet is mounted atop a second space frame cabinet.

41. A method of assembly of a reconfigurable space frame cabinet, said method comprising the steps of:

removably mounting a first elongated corner member and a first base mounting member substantially perpendicular to a first channel member;

removably mounting a second elongated corner member and a second base mounting member substantially perpendicular to the first channel member;

removably mounting a third elongated corner member and a third base mounting member substantially perpendicular to a second channel member;

removably mounting a fourth elongated corner member and a fourth base mounting member substantially perpendicular to the second channel member;

removably mounting a top mounting plate substantially perpendicular to each elongated corner member;

positioning a first side panel within a first channel in the first channel member and against the first and second elongated corner members;

positioning a second side panel within a second channel in the second channel member and against the third and fourth elongated corner members;

removably engaging a first trim cover to the first elongated corner member to removably secure the first side panel against the first elongated corner member;

removably engaging a second trim cover to the second elongated corner member to removably secure the first side panel against the second elongated corner member;

removably engaging a third trim cover to the third elongated corner member to removably secure the second side panel against the third elongated corner member;

removably engaging a fourth trim cover to the fourth elongated corner member to removably secure the second side panel against the fourth elongated corner member;

removably mounting a top cover atop the top mounting plate; and adjustably mounting a plurality of hardware fittings to the first elongated corner member, the second elongated corner member, the third elongated corner member and the fourth elongated corner member to configure the reconfigurable space frame cabinet to meet a user's requirements.

42. The method as defined in claim 41 further comprising the step of removably mounting the reconfigurable space frame cabinet to a vehicle.

43. The method as defined in claim 42 wherein the steps of engaging the first trim cover to the first elongated corner member, the second trim cover to the second elongated corner member, the third trim cover to the third elongated corner member and the fourth trim cover to the fourth elongated corner member further comprises the steps of:

providing two parallel extending resilient fingers on each trim cover for removably and resiliently engaging two parallel extending grooves on each elongated corner member; and removably and resiliently engaging the two parallel extending resilient fingers on each trim cover with the corresponding two parallel extending grooves on each elongated corner member.

* * * * *

UNITED STATES PATENT AND TRADEMARK OFFICE
CERTIFICATE OF CORRECTION

PATENT NO. : 5,590,939
DATED : January 7, 1997
INVENTOR(S) : David P. Piontek

It is certified that error appears in the above-indentified patent and that said Letters Patent is hereby corrected as shown below:

Column 2, line 47, "inventor" should be -- invention --.

Column 2, line 55, delete "a", (2nd. occ.).

Column 3, line 16, "removable" should be -- removably --.

Column 3, line 36, "groves" should be -- grooves --.

Column 3, line 55, "forth" should be -- fourth --.

Column 4, line 6, "forth" should be "fourth".

Column 4, line 22, "forth" should be -- fourth --.

Column 6, line 56, "a" should be -- an --.

Column 9, line 11, delete "(2)".

Column 10, line 41, after "The" insert -- reconfigurable --.

Column 11, line 55, "adjustable" should be -- adjustably --.

Column 11, line 58, "adjustable" should be -- adjustably --.

UNITED STATES PATENT AND TRADEMARK OFFICE
CERTIFICATE OF CORRECTION

PATENT NO. : 5,590,939
DATED : January 7, 1997
INVENTOR(S) : David P. Piontek

It is certified that error appears in the above-indentified patent and that said Letters Patent is hereby corrected as shown below:

Column 11, line 60, "adjustable" should be -- adjustably --.

Column 11, line 67, "adjustable" should be -- adjustably --.

Signed and Sealed this

Ninth Day of September, 1997

Attest:

BRUCE LEHMAN

Attesting Officer

Commissioner of Patents and Trademarks